(12) United States Patent
Øverbye

(10) Patent No.: US 10,068,341 B2
(45) Date of Patent: Sep. 4, 2018

(54) BORDER DETECTION

(71) Applicant: String Limited, Surrey (GB)

(72) Inventor: Johan Øverbye, Kongsberg (NO)

(73) Assignee: String Limited, Surrey (GB)

( * ) Notice: Subject to any disclaimer, the term of this patent is extended or adjusted under 35 U.S.C. 154(b) by 62 days.

(21) Appl. No.: 15/310,054

(22) PCT Filed: May 13, 2015

(86) PCT No.: PCT/GB2015/051406
§ 371 (c)(1),
(2) Date: Nov. 9, 2016

(87) PCT Pub. No.: WO2015/173566
PCT Pub. Date: Nov. 19, 2015

(65) Prior Publication Data
US 2017/0270673 A1    Sep. 21, 2017

(30) Foreign Application Priority Data
May 13, 2014   (GB) .................................. 1408495.8

(51) Int. Cl.
*G06K 9/48* (2006.01)
*G06T 7/13* (2017.01)
*G06T 7/136* (2017.01)
*G06T 7/174* (2017.01)
*G06T 7/143* (2017.01)

(52) U.S. Cl.
CPC ............... *G06T 7/13* (2017.01); *G06T 7/136* (2017.01); *G06T 7/143* (2017.01); *G06T 7/174* (2017.01)

(58) Field of Classification Search
CPC .......... G06T 7/13; G06T 7/136; G06T 7/143; G06T 7/174
USPC ......................................................... 382/199
See application file for complete search history.

(56) References Cited

U.S. PATENT DOCUMENTS

2012/0327486 A1* 12/2012 Lee ..................... H04N 1/107
358/505

OTHER PUBLICATIONS

Anonymous: "Edge Detection CS/BIOEN 4640: Image Processing Basics", Feb. 9, 2012, URL:http://www.coe.utah.edu/~cs4640/slides/Lecture8.pdf.*
Anonymous: "Edge Detection CS/BIOEN 4640: Image Processing Basics", Feb. 9, 2012 (Feb. 9, 2012).
Roger Bourne: "Fundamentals of Digital Imaging in Medicine" In: "Fundamentals of Digital Imaging in Medicine", Jan. 1, 2010 (Jan. 1, 2010), Springer London p. 162.
Jun S et al: "Image Smoothing and Edge detection by Hermite integration", Pattern Recognition, Elsevier, GB, vol. 28, No. 8, Aug. 1, 1995 (Aug. 1, 1995), pp. 1159-1166.

(Continued)

*Primary Examiner* — Raj Chakraborty
(74) *Attorney, Agent, or Firm* — Mintz Levin Cohn Ferris Glovsky and Popeo, P.C.

(57) ABSTRACT

A method for assessing the presence of a border in an image, the method comprising: for each of two pixel positions estimating the strength of the second-order rate of change of a convolution of said image at the pixel position with respect to a plurality of directions and determining a binary condition of the pixel position in dependence on whether the strength exceeds a predetermined threshold; and assessing the presence of a border by comparing the two binary conditions.

20 Claims, 2 Drawing Sheets

(56) References Cited

OTHER PUBLICATIONS

Grimson: "A computer Implementation of a Theory of Human Stereo Vision", Philosophical Transitions of the Royal Society of London, Series B, Biological Sciences biological Sciences, May 12, 1981 (May 12, 1981), pp. 217-253.
International search report issued in PCT/GB2015/051406 dated Oct. 7, 2015.
Search report issued in GB1408495.8 dated Nov. 16, 2015.

* cited by examiner

| | A | B | C | D | E | F | G |
|---|---|---|---|---|---|---|---|
| 1 | 1 | 2 | 1 | 1 | 9 | 8 | 9 |
| 2 | 1 | 0 | 2 | 0 | 7 | 8 | 9 |
| 3 | 3 | 2 | 1 | 1 | 9 | 9 | 8 |
| 4 | 1 | 0 | 2 | 6 | 7 | 9 | 9 |
| 5 | 0 | 2 | 1 | 4 | 8 | 8 | 7 |
| 6 | 2 | 1 | 1 | 2 | 9 | 8 | 7 |

BORDER DETECTION

CROSS-REFERENCES TO RELATED APPLICATIONS

This application is a national stage entry, filed under 35 U.S.C. § 371, of International Application No. PCT/GB2015/051406, filed on May 13, 2015, and claims the benefit of and priority to Great Brittan Patent Application No. 1408495.8, filed on May 13, 2014, the entire contents of which are hereby incorporated herein by reference in their entireties and for all purposes.

This invention relates to detecting borders in images.

It is commonplace for computing devices to gather, process and display images. For example, many mobile phones, tablet computers and personal computers can collect images from an on-board camera, process those images and display the processed images on a screen. The processing could involve a very simple algorithm such as converting a still image from colour to greyscale. More complex algorithms might include noise reduction and tonal enhancement, and might be applied to video rather than to still photos.

An important field of image analysis is border or boundary detection. Border detection involves estimating the location of borders between objects as represented in an image. Once the locations of the borders have been estimated additional processing could be carried out on the image. In one example, the additional processing could involve highlighting a border in a bright colour in order to draw attention to an object. This might be useful in providing night vision capabilities for vehicles. In a second example, the additional processing could involve re-colouring the area of an image surrounded by a border in order to create a visual effect. In a third example, the additional processing could involve inferring a three-dimensional relationship between objects whose borders have been estimated, either from a single image or from a series of images of a similar scene taken at different locations.

Although border detection can provide many advantages, it is a complex problem, and is particularly difficult to implement on a device that has relatively little computing power. An example of this is when border detection is to be performed on a mobile phone. The computing power of mobile phones is increasing, but it is still very limited; and since mobile phones are battery powered it is desirable to minimise the amount of energy they expend in performing video processing, to thereby improve battery life.

Examples of border detection algorithms are disclosed in EP 2 615 597 A, US 2014/072208, WO 2013/186662 and CN 103440644 A.

It would be desirable to have a border detection algorithm that was reasonably accurate and could be operated on a portable device such as a mobile phone to analyse real-time video of reasonable resolution. Such an algorithm could provide major advantages in the ability of such portable devices to interpret their environment in three dimensions, and provide a gateway to many desirable application features.

According to one aspect of the present invention there is provided a method for assessing the presence of a border in an image, the method comprising: for each of two pixel positions estimating the strength of the second-order rate of change of a convolution of said image at the pixel position with respect to a plurality of directions and determining a binary condition of the pixel position in dependence on whether the strength exceeds a predetermined threshold; and assessing the presence of a border by comparing the two binary conditions.

According to a second aspect of the invention there is provided a device for assessing the presence of a border in an image, the device being configured to perform the steps of: for each of two pixel positions estimating the strength of the second-order rate of change of a convolution of said image at the pixel position with respect to a plurality of directions and determining a binary condition of the pixel position in dependence on whether the strength exceeds a predetermined threshold; and assessing the presence of a border by comparing the two binary conditions.

The strength of the second-order rate of change may be estimated in dependence on one or more preferably a plurality of the values of the second-order derivatives of said convolved image at the pixel position with respect to the plurality of directions. The strength may be estimated as the highest absolute value of those second-order derivatives. The strength may be estimated as a measure of the absolute magnitude of one or more of those second-order derivatives.

The second-order derivative with respect to a given direction may be estimated by observing and/or in dependence on an attribute of the convolved image at the pixel position and two other positions along the direction and on either side of the pixel position.

The second-order derivative may be estimated with respect to four directions. The directions may be regularly rotationally offset.

The image may be defined by an array of pixels, each pixel having a set of discrete attributes.

The said two pixels may be adjacent pixels.

The method may comprise assessing a border to be present between two pixel positions if the said binary conditions of those pixel positions differ.

The method may comprise assessing a border not to be present between two directly adjacent pixel positions if the said binary conditions of those pixel positions are the same.

The convolution of the image at a pixel position may be dependent on data defining the image as represented in a plurality of pixels neighbouring that pixel position.

The convolution of the image may be an isotropic Gaussian convolution.

The device may comprise a camera. The image may be derived from the camera.

The present invention will now be described by way of example with reference to the accompanying drawings. In the drawings.

In one example algorithm, an image is composed of a set of pixels arranged on an orthogonal grid. A set of nine representative values are determined, one for each pixel position in a three-by-three block of pixel positions. The representative value for each pixel position may be determined by an isotropic function centred on the respective pixel position, the isotropic function being dependent on one or more visual attributes of the respective pixel and pixels around it. The isotropic function may or may not be dependent on a Gaussian filter or other convolution applied to the luminance of the relevant pixels. Then the nine representative values are analysed to estimate an attribute. The attribute might notionally be ascribed to the pixel position at the centre of the three-by-three block. The attribute might be usable to estimate whether a border passes in the region of the centre pixel position, or it might be used for other purposes. Once a representative value has been computed for each pixel of the block, the analysis involves estimating the second-order derivative of multiple series of those values, each of which includes the central pixel of the block and two pixels on opposite sides of the central pixel.

In a subsequent process those second-order derivatives or a value derived from them may be compared to a value or values determined in a similar way for a three-by-three block centred on another pixel position. The result of that comparison may be used to assess whether a border is present between the two centre pixel positions.

Figures 1, 2:
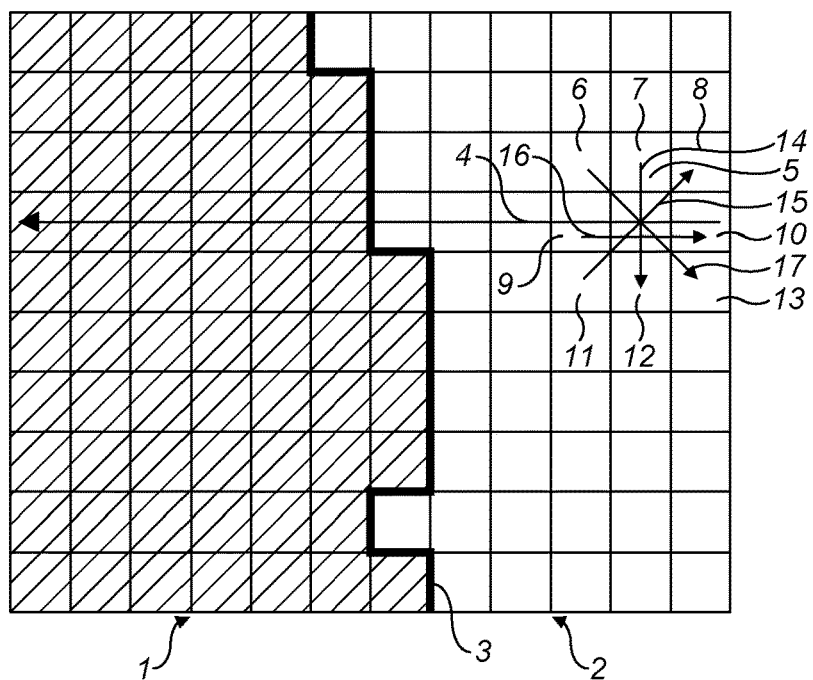
FIG. 1 illustrates an array of pixels in an image.
FIG. 2 illustrates an array of pixels in an image, the value of an attribute of each pixel being shown in a circle in the respective pixel.

FIG. 1 shows an example image. The image is made up of an array of pixels arranged on an orthogonal grid. The image includes a first region 1, shown as shaded in FIG. 1, and a second region 2, shown as unshaded. The border between the regions is shown at 3.

It may be desired to detect the border 3. One reason for wanting to detect the border might be to establish the location of region 1 in order to transform it, for example by re-colouring. Another reason might be to characterise the image by detecting objects displayed in the image, for example as a means to estimating their relative positions in three-dimensional space. The border might be a border between two visually distinct parts of the image.

A path 4 across the image is defined. The way in which this path can be defined is described in more detail below. The process of detecting the border involves:
1. selecting successive adjacent pairs of pixel positions along the path 4, for example pixel positions 5 and 9;
2. performing processing for each of those pixel positions, based on one or more visual attributes of the pixel at the respective position and pixels surrounding it; and
3. comparing the determined attributes to assess whether a border is present between the two pixels. For example, a border may be determined to be present if the determined attributes lie on either side of a threshold.

The path 4 may conveniently be straight and parallel to an axis on which the pixels are disposed, but it could alternatively be curved and/or set at an angle to pixel axes. The process of selecting successive pixels along the path could involve stepping by one pixel along the path, or stepping by more than one pixel.

The manner in which an attribute is determined for a pixel position will now be described.

Pixel positions on the path that are at the edge of the image may be ignored because the edge of the image necessarily constitutes a border. The first pixel position on the path that is not adjacent to an edge of the image is pixel 5. It is surrounded by eight other pixels 6-13, each of which is adjacent laterally or diagonally to pixel 5. Pixels 5-13 constitute a three-by-three block of pixels. In order to estimate an attribute for pixel position 5, the following steps are performed in order.
1. A is evaluated in respect of the each of the pixel positions 5-13. The representative value of a pixel position could be a simple characteristic of the respective pixel position, for example its brightness or hue. Alternatively it could be a value that is dependent on the nature of the respective pixel and other pixels around it. In one particularly advantageous case the representative value is derived by applying a Gaussian filter centred on the respective pixel position to the luminance of the pixel at that position and other pixels surrounding it. The representative value is evaluated using the same function for each of the pixels.
2. Four directions 14-17 are defined. Each direction intersects the central pixel 5 and two of the surrounding pixels 6-13. Direction 14 runs vertically through pixels 7, 5 and 12 in that order. Direction 15 runs diagonally from bottom left to top right through pixels 11, 5 and 8 in that order. Direction 16 runs horizontally through pixels 9, 5 and 10 in that order. Direction 17 runs diagonally from top left to bottom right through pixels 6, 5 and 13 in that order. These directions symbolise four numeric series, each series consisting of the representative values of the pixel positions lying on a respective one of the directions, in order. For example, if the representative values of the pixels are:

| Pixel | Attribute value |
|---|---|
| 5 | 9 |
| 6 | 12 |
| 7 | 9 |
| 8 | 10 |
| 9 | 2 |
| 10 | 8 |
| 11 | 3 |
| 12 | 4 |
| 13 | 11 |

Then the series are:

| Series | Direction | Values |
|---|---|---|
| A | 14 | 9, 9, 4 |
| B | 15 | 3, 9, 10 |
| C | 16 | 2, 9, 8 |
| D | 17 | 12, 9, 11 |

The directions are arrayed at regular rotational offsets. In the case of four directions, they can be at 0°, 45°, 90° and 135° to the horizontal/vertical axes on which pixels of the image are disposed.
3. The second-order derivative of each series is estimated. The second-order derivative may be estimated as the second numerical difference: $(V_3-V_2)-(V_2-V_1)$ or $V_1-2V_2+V_3$ where $V_1$, $V_2$ and $V_3$ are the first, second and third values in a series. Thus for the above example the second derivatives would be:

| Series | Second derivative |
|---|---|
| A | −5 |
| B | −5 |
| C | −8 |
| D | 5 |

Subsequently the second-order derivatives may be compared to a predetermined threshold as a precursor to further analysis, for example locating a boundary in the image. This may be done in a number of ways. First, each second derivative may be compared individually to the threshold, or alternatively the second-order derivatives may be compared in combination to the threshold: for example the mean of the four determined second derivatives may be compared to the threshold. Second, a determination as to whether a border is present may be dependent on whether the relevant measure exceeds the threshold, or whether the relevant measure is below the threshold or whether the absolute value of the relevant measure is above or below the threshold. Which of these is appropriate will depend on the attribute that was evaluated for the pixels. Whether a border is indicated if the relevant measure is above or below the threshold may also depend on whether the second derivative is determined as a forward difference or a backward difference. In one preferred example the absolute value of each second derivative is compared to the threshold at two respective adjacent pixel positions, and a border is determined to be present if any of the second derivatives of the first pixel position exceeds the threshold, but none of the second derivatives for the second pixel position do, and otherwise no border is determined to be present.

In general the presence of a border may be assessed by applying a binary test to the strength of the second-order rate of change of a convolution of said image at the pixel position with respect to a plurality of directions in order to produce a binary condition, e.g. 0 or 1. The second-order rate of change may be computed as the second order derivative or an approximation thereof. The strength of the second-order rate of change is conveniently formed by means of a function that takes as input all the second-order rates of change for different directions at the respective pixel position. In one example it may be represented by the highest absolute value of any of those second-order rates of change. In another example it may be represented by the sum of the squares of all those second-order rates of change. The binary test may be to assess whether the strength exceeds or does not exceed a predetermined threshold.

Once it has been determined whether a border is present between two adjacent pixel positions, the process may proceed in a number of ways. In one example, if a border has been determined to be present then the algorithm could attempt to follow it in order to learn its route across the image, whereas if no border has been determined to be present then the algorithm could proceed to consider another set of pixel positions along the original path 4 to assess whether there is a border centred on that other set. These processes could repeat, with additional paths 4 being chosen as appropriate, until the borders of the image have been fully characterised. Additional paths 4 may be scanned that are parallel to the original path 4 and offset from it by a number of pixels. The offset may for example be between 10 and 70 pixels, more preferably between 20 and 40 pixels.

Other inputs may additionally contribute to the assessment of whether a border is present between a set of pixel positions. For example, if the analysis described above indicates that a border is present then a border may nevertheless only be assessed to be present if one or more additional criteria are met. Similarly, if the analysis described above indicates that a border is not present then a border may nevertheless only be assessed to be not present if one or more additional criteria are met.

In the example above, four series are analysed at each pixel position, and each series consists of three attribute values. In alternative arrangements, each pixel position could comprise more attribute values: for example each series could extend to two pixels on either side of the candidate pixel, to a total of five pixels per series. More or fewer series could be utilised: for example only series A and C as identified above, or additional series at angles intermediate between those of series A to D as identified above. Each series may consist of the attributes of all pixels that are intersected by a straight line that runs through the pixel the vicinity of which is being tested for the presence of a border and extends an equal distance on either side of that pixel position. The set of lines defining the series may be spaced at regular angles of, for example, 90°, 45° or 22.5°.

FIG. 2 shows another example of a part of an image. In FIG. 2 the representative values of each pixel position are shown in the respective pixels and the pixels will be referred to by their grid position according to the references along the top and left of the figure. The predetermined threshold in this example is 6.

The starting pixel is B3, and the image is initially being scanned on a path running from B3 to G3. The second derivatives for pixel B3 are −4, −1, 0 and −1. The highest absolute value of none of these exceeds the threshold. Therefore that pixel position is considered to be negative. Processing steps to the next pixel along the initial scan path, which is C3. The second derivatives for pixel position C3 are 2, −1, 1 and 4. The absolute value of none of these exceeds the threshold. Therefore that pixel position is considered to be negative. Since both B3 and C3 are considered to be negative, no border is deemed to exist between them. Processing steps to the next pixel along the initial scan path, which is D3. The second derivatives for pixel position D3 are 4, 7, 8 and 7. Since the absolute value of at least one of these exceeds the threshold, that pixel position is considered to be positive. Since both one of C3 and D3 is positive and the other negative a border is deemed to exist between them. The algorithm can subsequently attempt to follow that border.

When a border has been fully traced (e.g. when it has been traced in a continuous loop back to where it was first detected) then scanning can resume along the original path (in this example the path from B3 to G3).

Once the edge of the image has been reached it may be scanned in a path offset linearly from the original scanning path (from B3 to G3). The offset can be set depending on any one or more of the level of accuracy required, the expected detail in the image, the amount of time available to process the image and the processing capabilities of the apparatus on which the algorithm is running. The offset could, for example, be between 10 and 70 pixels, more preferably between 20 and 40 pixels.

The representative value of each pixel position that is used in the processing described above can be selected dependent on the characteristics it is desired to analyse. In some examples, the attribute could be dependent solely on the values of that individual pixel: for example its brightness or hue. In other examples the attribute of the pixel position can be determined by a function that is also dependent on the values of neighbouring pixels. In this latter case the algorithm may be variable so as to allow the relative influence of pixels distant from the pixel in question to be increased or decreased. The attribute may be determined by summing intermediate values calculated for a set of pixels neighbouring the pixels in question. The extent of those neighbouring values may be variable. The extent may be selected in dependence on the level of detail, focus or range at which the image is being considered. Each intermediate value may be weighted by a weighting factor determined according to a weighting algorithm. In one preferred example the attribute of each pixel is determined by means of the Gaussian blur filter. The Gaussian can be calculated by determining a weighted sum of the intensities of pixels neighbouring the pixel in question, the weights being determined according to the Gaussian filter centred on the pixel position in question. With the pixel position in question being x=0, y=0, the Gaussian filter gives a weighting for a pixel at x, y of:

$$\frac{1}{2\pi\sigma^2}e^{-\frac{x^2+y^2}{2\sigma^2}}$$

Where σ represents the Gaussian standard deviation. The weightings may be calculated in advance and stored in a look-up table for use when the attribute of a given pixel is to be computed. Weightings for a range of values of a may be pre-computed and stored and applied as appropriate when the image is to be analysed at an appropriate level of detail. The weightings may be approximated for convenience. When estimating the attribute of a particular pixel position the weightings may conveniently be applied only to the pixels of a square block (i.e. a block whose sides are of equal pixel length) centred on that pixel, and thus not to pixels outside that block. This can simplify the computation.

Figure 3:
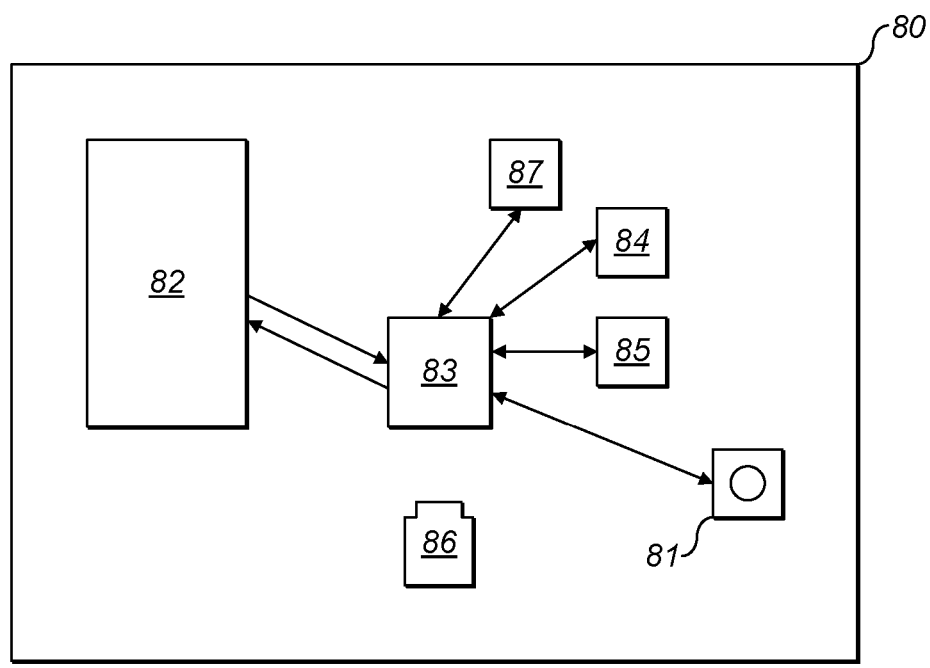
FIG. 3 shows a device suitable for image processing.

FIG. 3 illustrates apparatus for implementing the methods described above. The apparatus comprises a housing 80 in which are a camera 81, a display 82, a processor 83, a non-volatile memory or ROM 84 and a working memory or RAM 85. The apparatus is powered by a battery 86. In this example the display 82 is a touchscreen, so it provides user input to the processor 83 as well as being driven by the processor, but a separate keypad could be provided. The ROM 84 stores program code that is executable by the processor. The program code is stored in a non-transient form. The program code is executable by the processor to perform the functions described above. In operation the processor can receive an image, either from the camera 81 or from a remote communications transceiver 87. In the former case, the image could be an image captured by the camera of the environment at the location of the device. In the latter case, the image could be downloaded from the internet. The processor stores the image in RAM 85. The image could be displayed on the display 82. Once the image is stored in RAM, the processor can analyse it using an algorithm as described above. Then, dependent on the outcome of the analysis the process may perform further operations in dependence on the stored program code. For example, it could alter the image to highlight detected borders. Alternatively it could re-colour regions inside one or more detected borders, for example in response to selection of those regions by a user by means of the touchscreen. Alternatively, a user could select one of those regions, and the processor could identify other regions that are surrounded by detected borders and have attributes in common with the selected region (for example a hue that differs by less than a predetermined threshold from the average hue of the selected region) and then recolour both the selected and the identified regions similarly. Alternatively, the processor could use the position of the detected borders to infer information about the three-dimensional spatial relationship of objects represented in the image. This may be done by comparing the result of a first border detection pass over the image using a first effective analysis radius (e.g. the value a discussed above) and a second border detection pass over the image using a second effective analysis radius different from the first.

In the example above, the device can capture image data and process it locally. Alternatively, it could capture image data, transmit it to a remote server for analysis and then receive back from the server information related to the detected borders.

The device of FIG. 3 could be a mobile phone.

The image could be a still age or a frame or portion of a frame of a video stream.

Each pixel is a sub-unit of the image. The pixels could be monochrome or colour pixels. For display or image capture a colour image is often divided into channels of individual colours which when considered collectively represent a certain luminance and chrominance at a certain location. For the purpose of performing the algorithm described above a single pixel of the image may be considered to be formed by those channels in combination. Preferably for the purpose of performing the algorithm described above each pixel fully characterises the visual content of the image at the location of the pixel.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for assessing the presence of a border in an image, the method comprising:
for each of two pixel positions estimating the strength of the second-order rate of change of a convolution of said image at the pixel position with respect to a plurality of directions and determining a binary condition of the pixel position in dependence on whether the strength exceeds a predetermined threshold; and
assessing the presence of a border by comparing the two binary conditions,
wherein the strength of the second-order rate of change is estimated as the highest absolute value of the second-order derivatives of said convolved image at the pixel position with respect to the plurality of directions.

2. A method as claimed in claim 1, wherein the second-order derivative with respect to a given direction is estimated by observing an attribute of the convolved image at the pixel position and two other positions along the direction and on either side of the pixel position.

3. A method as claimed in claim 1, wherein the second-order derivative is estimated with respect to four directions.

4. A method as claimed in claim 1, wherein the directions are regularly rotationally offset.

5. A method as claimed in claim 1, wherein the image is defined by an array of pixels, each pixel having a set of discrete attributes.

6. A method as claimed in claim 1, wherein the said two pixels are adjacent pixels.

7. A method as claimed in claim 1, comprising assessing a border to be present between two pixel positions if the said binary conditions of those pixel positions differ.

8. A method as claimed in claim 1, comprising assessing a border not to be present between two directly adjacent pixel positions if the said binary conditions of those pixel positions are the same.

9. A method as claimed in claim 1, where the convolution of the image at a pixel position is dependent on data defining the image as represented in a plurality of pixels neighbouring that pixel position.

10. A method as claimed in claim 1, where the convolution of the image is an isotropic Gaussian convolution.

11. A device for assessing the presence of a border in an image, the device being configured to perform the steps of:
for each of two pixel positions estimating the strength of the second-order rate of change of a convolution of said image at the pixel position with respect to a plurality of directions and determining a binary condition of the pixel position in dependence on whether the strength exceeds a predetermined threshold; and assessing the presence of a border by comparing the two binary conditions, wherein the strength of the second-order rate of change is estimated as the highest absolute value of the second-order derivatives of said convolved image at the pixel position with respect to the plurality of directions.

12. A device as claimed in claim 11, wherein the device comprises a camera and the image is derived from the camera.

13. A device as claimed in claim 11, wherein the second-order derivative is estimated with respect to four directions.

14. A device as claimed in claim 11, wherein the device is further configured to perform the step of assessing a border to be present between two pixel positions if the said binary conditions of those pixel positions differ.

15. A device as claimed in claim 11, wherein the second-order derivative with respect to a given direction is estimated by observing an attribute of the convolved image at the pixel position and two other positions along the direction and on either side of the pixel position.

16. A device as claimed in claim 11, wherein the directions are regularly rotationally offset.

17. A device as claimed in claim 11, wherein the device is further configured to perform the step of assessing a border not to be present between two directly adjacent pixel positions if the said binary conditions of those pixel positions are the same.

18. A device as claimed in claim 11, where the convolution of the image at a pixel position is dependent on data defining the image as represented in a plurality of pixels neighbouring that pixel position.

19. A device as claimed in claim 11, where the convolution of the image is an isotropic Gaussian convolution.

20. A non-transitory computer readable storage medium having stored thereon computer readable instructions that, when executed at a computer system, cause the computer system to perform a method for assessing the presence of a border in an image, the method comprising:

for each of two pixel positions estimating the strength of the second-order rate of change of a convolution of said image at the pixel position with respect to a plurality of directions and determining a binary condition of the pixel position in dependence on whether the strength exceeds a predetermined threshold; and assessing the presence of a border by comparing the two binary conditions, wherein the strength of the second-order rate of change is estimated as the highest absolute value of the second-order derivatives of said convolved image at the pixel position with respect to the plurality of directions.

\* \* \* \* \*